UNITED STATES PATENT OFFICE.

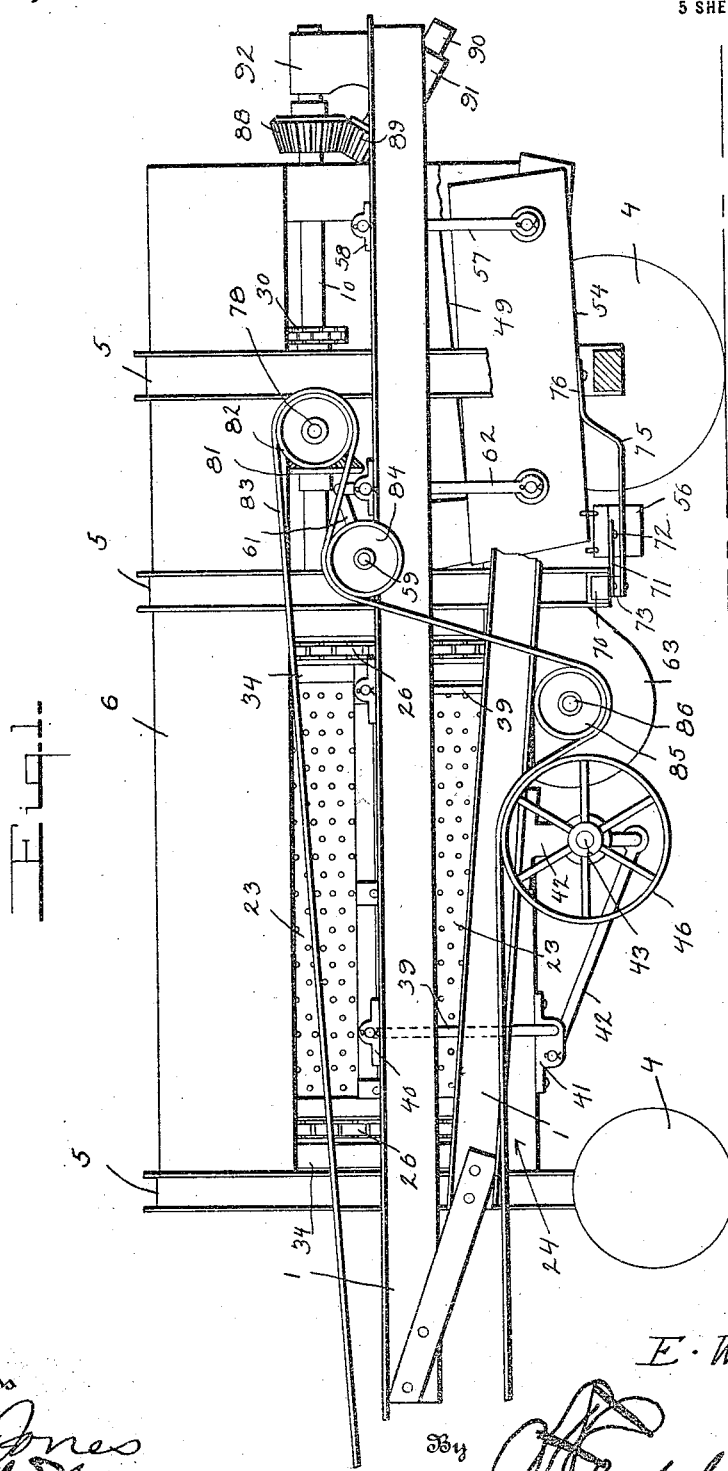

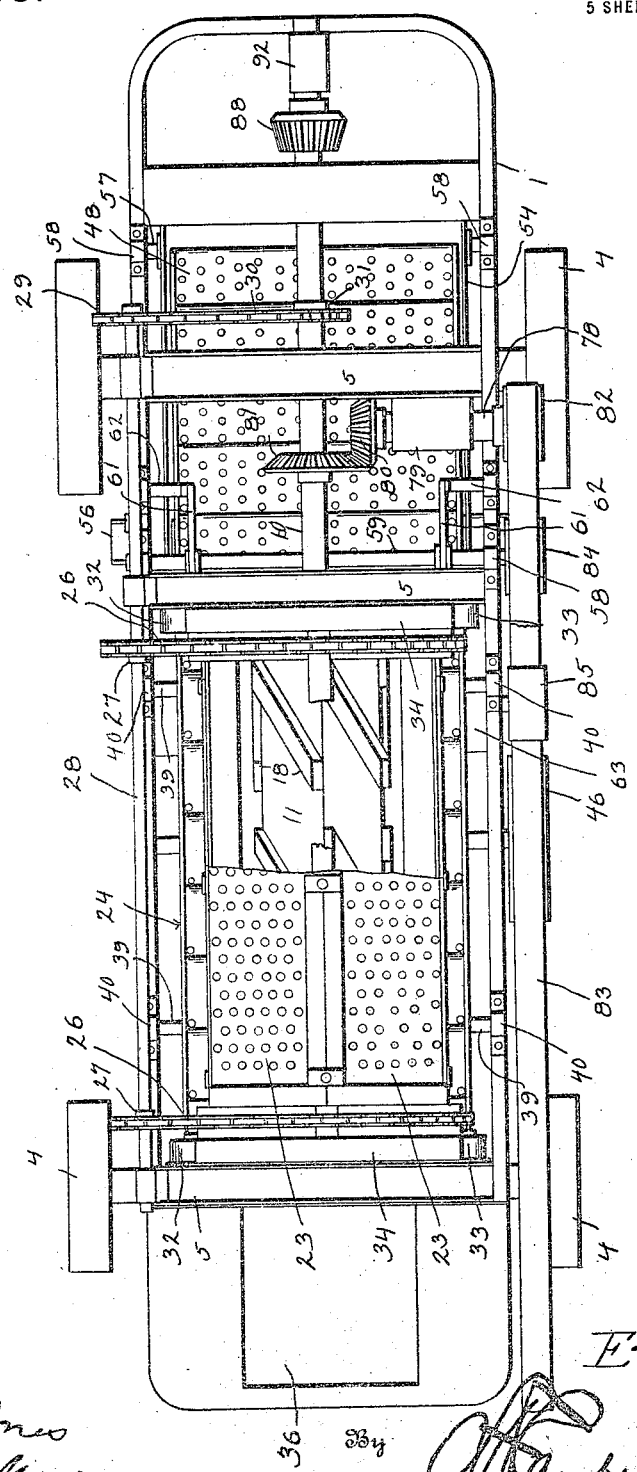

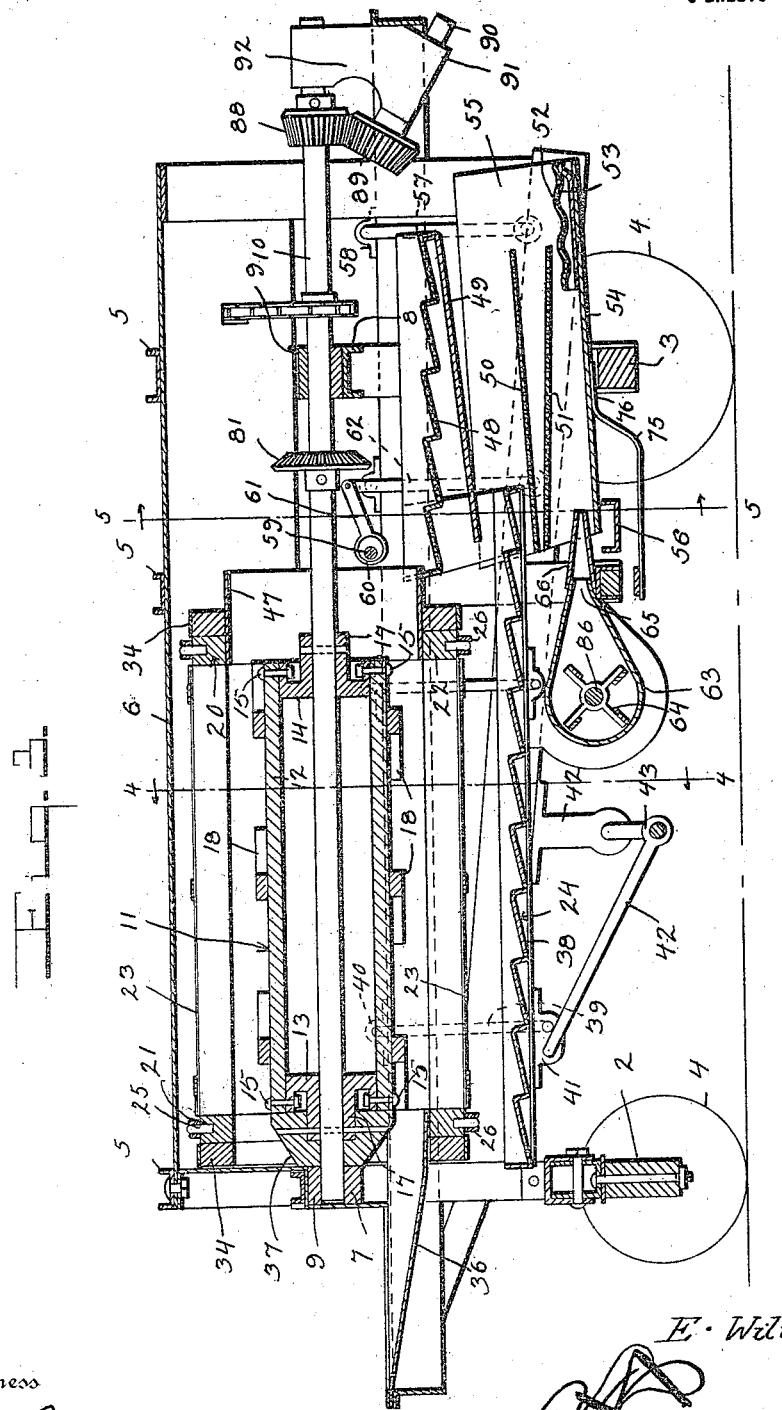

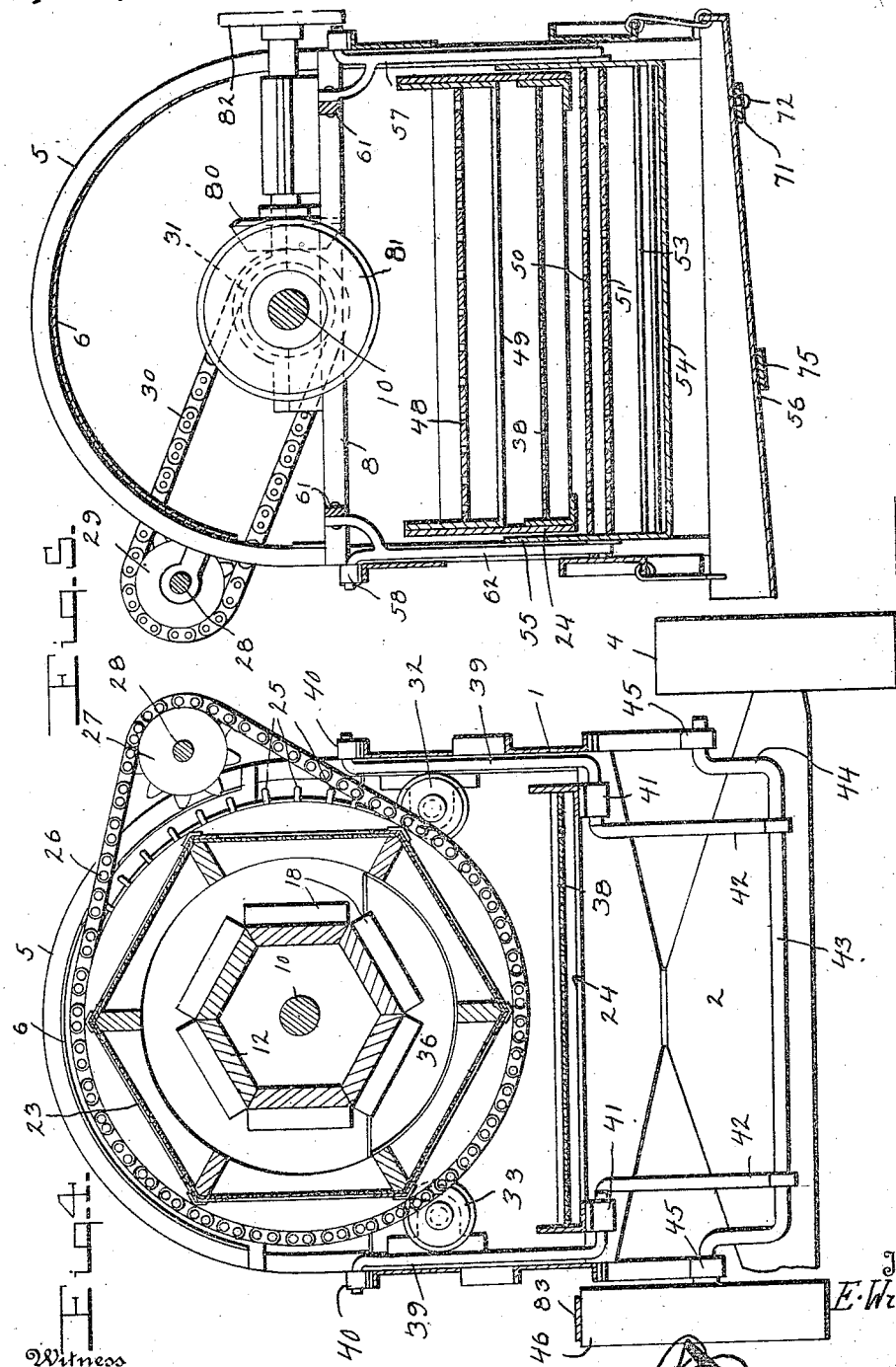

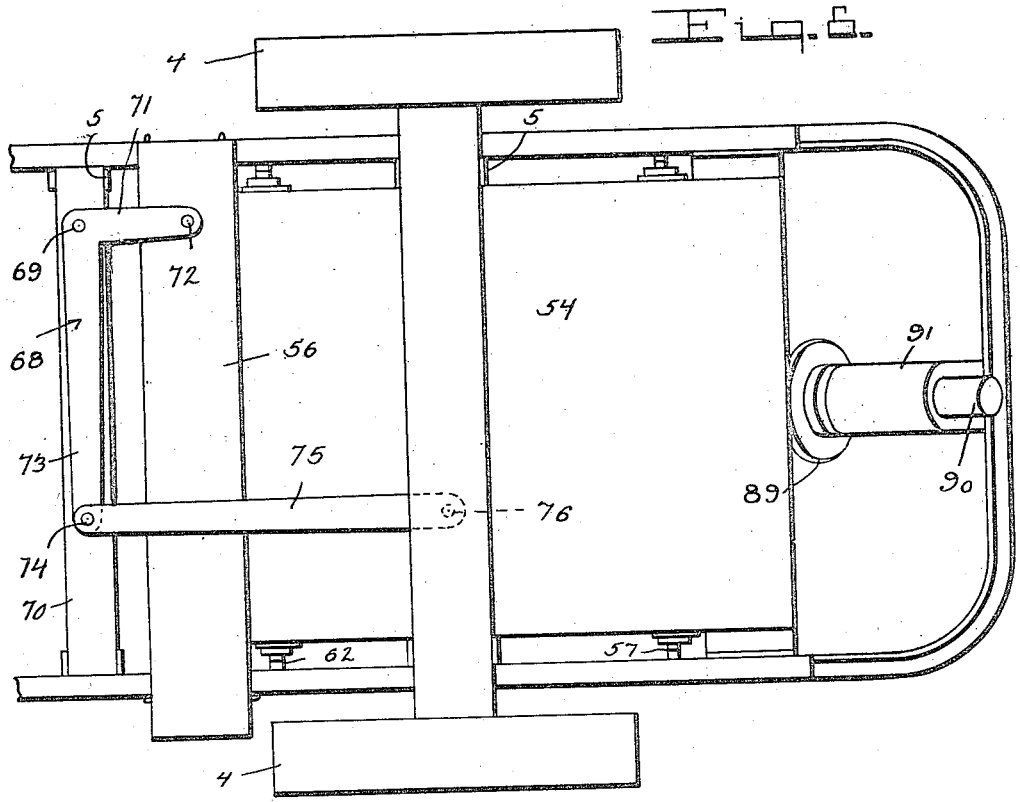
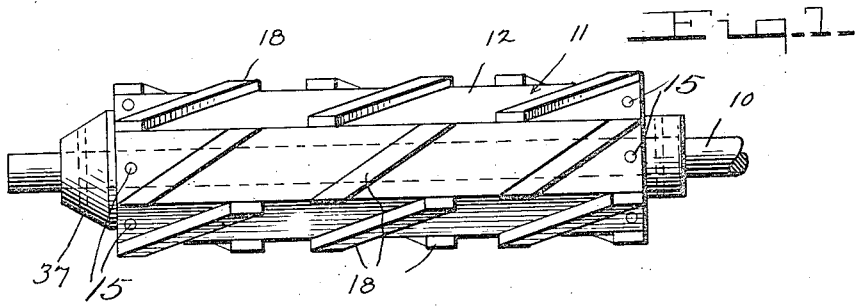

EDWARD WILLIAMS, OF SCHUYLERVILLE, NEW YORK.

THRESHER.

1,257,058.  Specification of Letters Patent.  Patented Feb. 19, 1918.

Application filed August 9, 1916. Serial No. 114,038.

*To all whom it may concern:*

Be it known that I, EDWARD WILLIAMS, a citizen of the United States, residing at Schuylerville, in the county of Saratoga and State of New York, have invented certain new and useful Improvements in Threshers; and I do hereby declare the following to be a full, clear, and exact description of the invention, such as will enable others skilled in the art to which it appertains to make and use the same.

This invention relates to threshers and more particularly to a thresher which is designed for threshing beans, peas or analogous agricultural products, and the primary object of the invention is to provide a thresher which is constructed so that it will thresh dry beans, and thoroughly clean them without cracking them or breaking up the beans during the threshing thereof.

Another object of this invention is to provide a bean thresher which includes a novel beating structure for replacing the ordinary type of rotary cylinders and concaves used in threshers, which rotary beating structure extends longitudinally of the thresher, so that the beans are fed into one end of the beater and travel therethrough, longitudinally of the thresher and further to construct the beater structure of an outer rotary shell which is provided with a foraminous outer wall and which rotates about an internally positioned rotary beater which has a plurality of angularly disposed cleats formed upon the periphery of the same for engaging the beans and throwing them against the foraminous shell of the outer rotary member and also for directing them through the beating structure.

Another object of this invention is to provide a substantially frusto-conical shaped member which is attached to the receiving end of the internal rotary beater for preventing the bean pods from clogging about the shaft which extends centrally through the inner rotary beater.

Another object of this invention is to provide a grain pan which is positioned beneath the rotary beater structure for receiving the beans therefrom and which has suitable means connected thereto for vibrating the pan for carrying the beans rearwardly over its surface and further to provide a second vibratory grain pan structure which receives the partially threshed beans from the delivery end of the rotary beater structure, and shakes them, and deposits them upon a vibrating riddle which in turn delivers them to a second riddle, and in turn to a delivery trough.

A still further object of this invention is to provide means for vibrating the delivery trough for preventing the beans from clogging the trough and to insure their passage through the same.

A still further object of this invention is to provide means for blowing the chaff or crushed pods out of the rear end of the thresher which means includes a rotary fan and adjustably mounted guiding nozzles for directing the direction of travel of the air blast.

With the foregoing and other objects in view this invention consists in such novel features of construction, combination and arrangement of parts as will be hereinafter more fully described, illustrated in the accompanying drawings and claimed.

In describing the invention in detail reference will be had to the accompanying drawings wherein like characters designate like and corresponding parts throughout the several views, and in which:—

Figure 1 is a side elevation of the improved thresher.

Fig. 2 is a top plan view of the thresher.

Fig. 3 is a longitudinal section through the thresher.

Fig. 4 is a section on the line 4—4 of Fig. 3.

Fig. 5 is a section on the line 5—5 of Fig. 3.

Fig. 6 is a fragmentary bottom plan of the thresher, and

Fig. 7 is a detail view of the internal rotary beater.

Referring more particularly to the drawings, 1 designates the supporting frame of the thresher which has front and rear axle structures 2 and 3 respectively carried thereby, upon which are mounted the usual type of supporting wheels 4. The supporting frame 1 has a plurality of arch supporting braces 5 connected thereto and extending upwardly therefrom which braces form supports for the cover 6 that protects the working parts of the thresher. The foremost and rearmost arch brackets 5 have cross braces 7 and 8 carried thereby upon which are mounted suitable bearings 9. The bearings 9 rotatably support a shaft 10 which extends longitudinally through the center of the thresher and has a rotary beating member 11 mounted thereupon at the forward receiving end of the thresher.

The rotary beater which is generically indicated by the numeral 11 comprises a plurality of plates 12 which are disposed angularly with respect to each other as clearly shown in Fig. 4 of the drawings. The plates 12 are attached to end pieces 13 and 14 by bolts or analogous fastening devices as indicated at 15. The collars or disks 13 and 14 have hubs 17 which are mounted upon the shaft 10.

Cleats 18 are attached to the outer surfaces of the plates 12 and they incline toward the rear delivery end of the thresher as clearly shown in the drawings.

A shell beater 20 is positioned about the rotary beater 11 and it comprises end rings 21 and 22 to which a plurality of foraminous plates 23 are attached. The plates 23 are arranged at angles with respect to each other and parallel to the plates 12 as clearly shown in Fig. 4 of the drawings and the perforations in the plates 23 are of sufficient size so as to permit beans which have been thoroughly threshed to pass therethrough and also to permit sand and fine particles of pods or other foreign matter to fall through the opening, upon the vibration pan structure 24.

The end rings 21 of the shell beater have spurs or teeth 25 attached thereto at spaced intervals about their periphery, which teeth are provided for engagement with the links of sprocket chains 26. The sprocket chains 26 also travel about sprockets 27 which are mounted upon a shaft 28. The shaft 28 extends longitudinally along one side of the supporting frame 1 and has a sprocket 29 mounted thereon about which a sprocket chain 30 travels. The sprocket chain 30 also travels about a sprocket 31 which is carried by the shaft 10. In this manner the rotary shell beater is rotated by the rotation of the shaft 10 at a much slower rate of speed than is the internal rotary beater 11 rotated, owing to the fact that the end rings 21 and 22 of the outer or shell beater structure are considerably greater in diameter than the sprockets 27.

The outer rotary beater structure 20 is guided in its rotary movement by suitable guide rollers 32 and 33 which engage the periphery of rings 34 which are positioned outwardly from the rings 21 and 22. The rollers 32 and 33 rotate idly upon stub shafts which are carried by the supporting structure of the thresher.

The ends of the outer rotary beater 20 are open, and a feed board 36 is provided for guiding the beans to be threshed downwardly into the interior of the outer shell like rotary beater 20. A substantially frustoconically shaped block 37 is mounted upon the shaft 10 and engages the forward end of the inner rotary beater structure 11, providing an inclined surface for preventing the beans from clogging or becoming hung on the front end of the inner rotary beater structure, and properly guiding them inwardly into the outer rotary beater structure 20.

The pan 24 is preferably perforated so as to permit sand to fall therethrough and it has a corrugated bottom 38 which facilitates in shaking the sand, chaff or foreign substance from the threshed beans. The pan structure 24 is supported by hangers 39 which have their upper ends rockably mounted in suitable journals 40 and their lower ends connected to bearings 41 which are carried by the pan structure. Rods 42 are also connected to the bearings 41 and to the wrist portion 43 of a crank shaft 44. The crank shaft 44 is supported by suitable bearings 45 and it has a pulley 46 mounted thereon for rotating the shaft and consequently vibrating the pan structure 24.

The beans after they have traveled through the length of the beater structure are guided by a guiding ring 47 upon a pan structure 48 which has a corrugated surface as clearly shown in Fig. 3 of the drawings. The pan structure 48 is mounted for vibratory movement, so that the beans deposited thereon will travel over the full length of the same.

The corrugated surface of the pan structure 48 is perforated, so that beans will fall therethrough and they are guided downwardly by a guiding board 49, and deposited upon the rear end of the pan structure 24. The pan structure 48 is connected to the pan structure 24 in any suitable manner, for vibratory movement therewith. This may be accomplished by ears which extend upwardly from the rear delivery end of the pan structure 24 and are connected to the pan structure 48.

The beans are delivered by the pan structure 24 upon a sieve or riddle 50 which inclines upwardly, as clearly shown in Fig. 3 of the drawings, and the threshed beans will fall through the riddle 50 upon a second riddle or screen 51 which is positioned beneath the screen or riddle 50 and inclines downwardly. A corrugated riddle 52 is positioned beneath the delivery or lower end of the riddle 51 and it is provided with relatively small perforations 53 which are provided for permitting fine particles of sand or foreign matter to fall therethrough. The beans travel off the surface of the corrugated riddle 52 upon the upper surface of the bottom 54 of the shoe 55 and downwardly over this surface into the delivery trough 56.

The riddles 50, 51 and 52 are carried by the shoe 55, and this shoe is supported by suitable hangers 57 which have their upper ends rockably mounted in bearings 58 carried by the supporting structure of that thresher. A shaft 59 is rotatably carried by the supporting structure and it has an extension 60 mounted thereon, which is connected by means of an arm 61 to an arm 62, which is connected to the shoe 55, so that during the rotation of the shaft 59 the shoe 55 and the riddles or screens carried thereby will be vibrated for facilitating the threshing and cleaning of the beans. The eccentric 60 is constructed so that the riddles 50, 51 and 52 will be agitated faster than the pans 24 and 48 are agitated.

A fan casing 63 is carried by the under surface of the supporting structure of the thresher and it has a rotary fan 64 of ordinary construction positioned therein. The fan casing 63 extends entirely across the width of the thresher as does the fan 64, and the outlet 65 of the fan casing is directed toward the shoe 55. A nozzle 66 is adjustably connected to the outlet 65 of the fan casing 63 and it projects into the shoe 55, for directing the air blast from the fan into the shoe for blowing the chaff or fine particles of pods out of the shoe and into an ordinary blower structure which may be attached to the rear end of the thresher. In the drawings, no blower is illustrated, but it is to be understood that any ordinary or desired type of blower or stacker may be attached to the rear delivery end of the thresher without departing from the spirit of this invention.

The nozzle 66 is adjustably connected to the outlet 65 of the fan casing, so that it may be pivotally moved for directing the air blast in an upward path or in a relatively downward path, as desired, and as is found necessary under different conditions.

The trough 56, into which the cleaned and threshed beans are delivered from the shoe 55, inclines downwardly, toward its delivery end and it extends entirely across the width of the thresher, having its delivery end positioned outwardly of one side of the thresher for delivering the beans into a sack or other suitable receptacle.

A bell crank arm 68 is pivotally connected as shown at 69 to a cross beam 70, and its relatively short arm 71 is connected as shown at 72 to the under surface of the trough 56. The long arm 73 of the bell crank arm 68 is pivotally connected as shown at 74 to an arm 75. The arm 75 is connected to the under surface of the shoe 55 as shown at 76, so that upon the vibratory movement of the shoe 55, the bell crank arm 68 will be rocked upon its pivotal point 69 which will vibrate the trough 56 in a direction laterally of the movement of the pan, for shaking the beans out of the trough and preventing their clogging the same.

A relatively short shaft 78 is rotatably supported by a suitable bearing 79, and it has a bevel gear 80 mounted upon its inner end which meshes with a bevel gear 81 mounted upon the shaft 10, for rotating the shaft 10 by the rotation of the stub shaft 78. A pulley 82 is mounted upon the outer end of the shaft 78 and the power belt 83 travels about this pulley. The power belt 83 also travels about a pulley 84 which is mounted upon the shaft 59, about a pulley 85 which is mounted upon the propelling shaft 86 of the fan 64, about the pulley 46 which is mounted upon the crank shaft 43, and it may travel about the drive pulley of a suitable traction engine or prime mover. It will be seen, by the foregoing and the drawings, that only one belt is employed for operating all of the various pulleys of the thresher.

A bevel gear 88 is mounted upon the shaft 10 adjacent to its rear end, and it meshes with a second bevel gear 89 which is carried by a shaft 90. The shaft 90 extends downwardly at an angle from the shaft 10 and it is supported by suitable bearings 91 which are formed upon a bracket 92. The shaft 90 is provided for propelling a blower of ordinary type.

The operation of the improved thresher is generically as follows: The beans or other agricultural products to be threshed are deposited upon the feed board 36, which will guide them inwardly into the outer rotary beater 20 and they will then be engaged by the angularly disposed cleats 18 which are carried by the outer surface of the inner rotary beater 11, and thrown outwardly against the perforated plates 23 of the outer rotary beater 11. This operation will be repeated a number of times, during the passage of the beans through the beater structure which will tend to break up the pods, and free the beans therefrom. The inclined position of the cleats 18 will guide the beans rearwardly during the rotation of the beater, until they are deposited out of the delivery end of the beater structure, through the guiding ring 47 upon the vibratory pan 48. The vibration of the pan 48 will carry the beans over the corrugated upper surface of this pan structure and tend to shake the beans and parts of the pods therethrough upon the guiding boards 49 which will guide them downwardly and toward the forward end of the machine for deposit upon the rear delivery end of the pan 24. The vibratory movement of the pan 24 will deposit the beans therefrom upon the vibratory riddle 50. Certain of the beans will pass through this riddle upon the riddle 51, and the thoroughly threshed beans falling through the riddle 51 upon the upper surface of the bottom 54 of the shoe 55 will travel downwardly over this surface into the trough 56. The beans which travel over the entire upper surface of the riddles 50 and 51 will be deposited upon the corrugated riddle 52 and the vibration of this riddle will shake the beans off the forward end of the same upon the upper surface of the bottom 54 of the shoe 55. The perforations of the corrugated riddle 53 will permit fine particles of pods or hulls, dust or the like to fall therethrough and be separated from the beans.

The fan structure 64 will blow the chaff or pods outwardly into the ordinary blower structure.

The beans which are thoroughly threshed during their travel through the beater structures will pass outwardly through the perforations in the plates 23 and fall upon the upper corrugated surface of the pan structure 24. The perforations in this pan structure will permit sand or other foreign matter to fall through the riddle upon the ground, and be efficiently separated from the beans while the beans will be carried rearwardly, by the vibration of the pan structure and deposited upon the riddle 50 together with the beans which are deposited upon the rear end of the pan structure 49 from the pan structure 48.

The vibratory movement of the delivery trough 56 will prevent the beans from clogging therein and insure their passage out of the trough into a suitable retaining sack or receptacle.

From the foregoing description taken in connection with the accompanying drawings, the advantages of construction and of the method of operation of the improved thresher will be readily apparent to those skilled in the art to which this invention appertains, and while in the foregoing description, the principle of the operation of this invention has been described together with various features of construction, it is to be understood that certain minor features of construction, combination and arrangement of parts may be altered to suit practical conditions provided such alterations are comprehended within the scope of what is claimed.

What is claimed is:—

1. In a thresher structure, perforated longitudinally disposed cylindrical beating means, a vibratory grain pan positioned beneath the beating means for receiving beans which pass through the perforations thereof, a second vibratory grain pan positioned for receiving the vines and beans discharged axially from the delivery end of the longitudinal beating means and delivering the beans to the first named pan.

2. In a thresher structure, perforated longitudinally extending beating means, a vibratory grain pan positioned beneath the beating means for receiving beans which pass through the perforations thereof, a second vibratory grain pan positioned for receiving the vines and beans discharged axially from the delivery end of the longitudinal beating means and a guiding board positioned beneath the second vibratory pan for guiding beans from the second pan to the first named pan.

3. In a thresher structure, perforated longitudinally extending beating means, a vibratory grain pan positioned beneath the beating means for receiving beans which pass through the perforations thereof, a second vibratory grain pan positioned for receiving the vines and beans discharged axially from the delivery end of the longitudinal beating means, a guiding board positioned beneath the second vibratory pan for guiding beans from the second pan to the first named pan, a vibratory screen positioned for receiving beans from said first named pan, a delivery trough for receiving beans from said screen, and means for shaking said trough in a direction transversely to the direction of movement of the pan for causing the beans to pass through the trough.

4. In a thresher structure, perforated longitudinally extending cylindrical beating means, an imperforated vibratory grain pan positioned beneath the longitudinal beating means for receiving beans which pass through the perforations of the beating means, a perforated vibratory grain pan positioned for receiving the vines and beans discharged axially from the delivery end of the beating means, and a guiding board positioned beneath the perforated vibratory pan for guiding beans therefrom to the imperforated vibratory pan.

In testimony whereof I affix my signature in presence of two witnesses.

EDWARD WILLIAMS.

Witnesses:
 JEROME NABB,
 WILET ERNST.